United States Patent
Wang et al.

(10) Patent No.: US 7,426,959 B2
(45) Date of Patent: Sep. 23, 2008

(54) SYSTEMS AND METHODS FOR PRODUCING OIL AND/OR GAS

(75) Inventors: Dean Chien Wang, Missouri City, TX (US); Alexander Michiel Mollinger, Rijswijk (NL); Douglas Charlton McCammon, Houston, TX (US); Raul Valdez, Bellaire, TX (US); Johan Jacobus Van Dorp, Abu Dhabi (NL); Eric Johannes Puik, Rijswijk (NL); Michael Zvi Golombok, Rijswijk (NL); Willem Van Vark, Rijswijk (NL); Michiel Jan Groeneveld, Rijswijk (NL); Brendan Dermot Murray, Houston, TX (US); Thomas Mikus, Houston, TX (US)

(73) Assignee: Shell Oil Company, Houston, TX (US)

( * ) Notice: Subject to any disclaimer, the term of this patent is extended or adjusted under 35 U.S.C. 154(b) by 229 days.

(21) Appl. No.: 11/409,436

(22) Filed: Apr. 19, 2006

(65) Prior Publication Data

US 2006/0254769 A1 Nov. 16, 2006

Related U.S. Application Data

(60) Provisional application No. 60/772,691, filed on Feb. 13, 2006, provisional application No. 60/673,547, filed on Apr. 21, 2005.

(51) Int. Cl.
*C01B 17/20* (2006.01)
*E21B 43/34* (2006.01)
*E21B 43/40* (2006.01)

(52) U.S. Cl. ............... 166/52; 166/75.12; 166/90.1; 166/266; 166/267; 166/268; 423/443; 423/561.1

(58) Field of Classification Search ............... 166/52, 166/75.12, 90.1, 258, 266–268, 305.1; 405/12.35, 405/129.4; 423/443, 561.1; 588/250
See application file for complete search history.

(56) References Cited

U.S. PATENT DOCUMENTS

| 2,330,934 A | * | 10/1943 | Thacker | .................. 423/443 |
| 2,363,810 A |   | 11/1944 | Schrader et al. | .............. 315/20 |
| 2,833,711 A | * | 5/1958  | Arnold | .................... 507/259 |
| 3,070,162 A | * | 12/1962 | Barnard, Jr. | ................. 166/307 |

(Continued)

FOREIGN PATENT DOCUMENTS

EP 0581026 A1 2/1994

(Continued)

OTHER PUBLICATIONS

Petroleum Technology Transfer Council. "Application of the GasGun™ in Kansas Oil and Gas Operations". pp. 1-10.

(Continued)

*Primary Examiner*—George Suchfield
(74) *Attorney, Agent, or Firm*—William E. Hickman

(57) ABSTRACT

A system including a mechanism for recovering oil and/or gas from an underground formation, the oil and/or gas comprising one or more sulfur compounds; a mechanism for converting at least a portion of the sulfur compounds from the recovered oil and/or gas into a carbon disulfide formulation; and a mechanism for releasing at least a portion of the carbon disulfide formulation into a formation.

7 Claims, 10 Drawing Sheets

U.S. PATENT DOCUMENTS

| | | | |
|---|---|---|---|
| 3,366,452 A * | 1/1968 | Lauer | 423/418.2 |
| 3,393,733 A | 7/1968 | Kuo et al. | 166/8 |
| 3,415,573 A * | 12/1968 | Fraser | 299/4 |
| 3,445,181 A * | 5/1969 | Every et al. | 423/222 |
| 3,724,552 A * | 4/1973 | Snavely, Jr. | 166/304 |
| 3,838,738 A * | 10/1974 | Redford et al. | 166/271 |
| 3,850,245 A | 11/1974 | Allen et al. | 166/274 |
| 3,927,185 A | 12/1975 | Meadow et al. | 423/443 |
| 4,057,613 A | 11/1977 | Meadow et al. | 423/443 |
| 4,158,467 A * | 6/1979 | Larson et al. | 299/2 |
| 4,476,113 A | 10/1984 | Young et al. | 424/161 |
| 4,543,434 A | 9/1985 | Chang | 585/310 |
| 4,822,938 A | 4/1989 | Audeh et al. | 585/324 |
| 4,963,340 A | 10/1990 | Audeh et al. | 423/444 |
| 5,076,358 A | 12/1991 | Kissel | 166/275 |
| 5,097,903 A * | 3/1992 | Wilensky | 166/266 |
| 6,016,868 A * | 1/2000 | Gregoli et al. | 166/261 |
| 6,149,344 A | 11/2000 | Eaton | 405/128 |
| 6,357,526 B1 * | 3/2002 | Abdel-Halim et al. | 166/272.3 |
| 2001/0008619 A1 | 7/2001 | Geus et al. | 423/230 |
| 2002/0134706 A1 | 9/2002 | Keller et al. | 208/250 |
| 2003/0194366 A1 | 10/2003 | Srinivas et al. | 423/230 |
| 2004/0022721 A1 | 2/2004 | Watson et al. | 423/574.1 |
| 2004/0096381 A1 | 5/2004 | Watson et al. | 423/224 |
| 2004/0146450 A1 | 7/2004 | Stauffer | 423/443 |
| 2004/0159583 A1 | 8/2004 | Mesters et al. | 208/208 |
| 2008/0023198 A1 * | 1/2008 | Hsu | 166/268 |

FOREIGN PATENT DOCUMENTS

| | | |
|---|---|---|
| FR | 1461303 | 12/1966 |
| GB | 1007674 | 10/1965 |

OTHER PUBLICATIONS

Kirk-Othermer Encyclopedia of Chemical Technology. Third Edition. vol. 4, 1978 pp. 747-749.

International Search Report. TH2616 PCT -PCT US2006/014841, filing date Sep. 11, 2006.

Written Opinion. PCT/US2006/014841. TH2626 PCT. filing date Sep. 11, 2006.

* cited by examiner

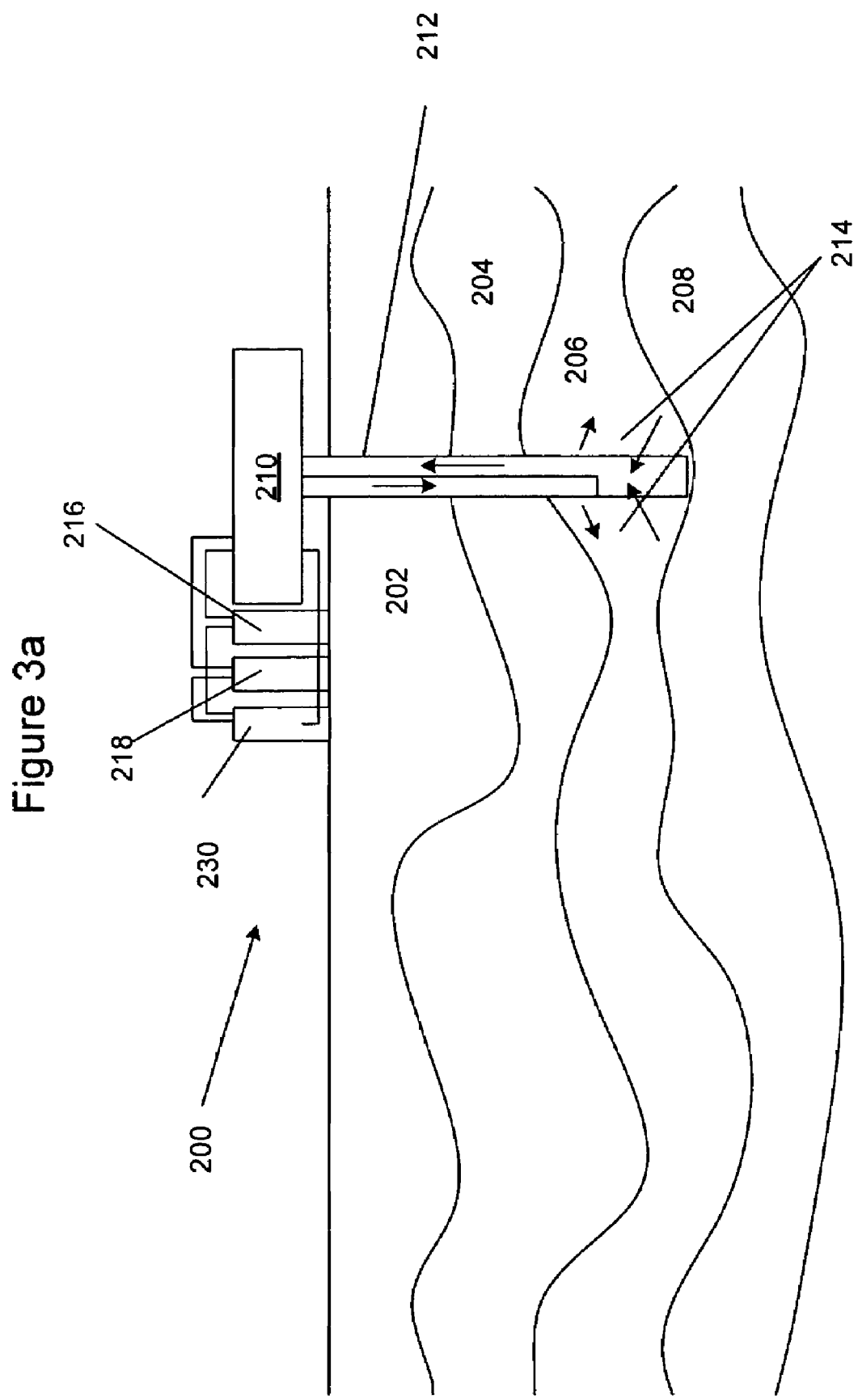

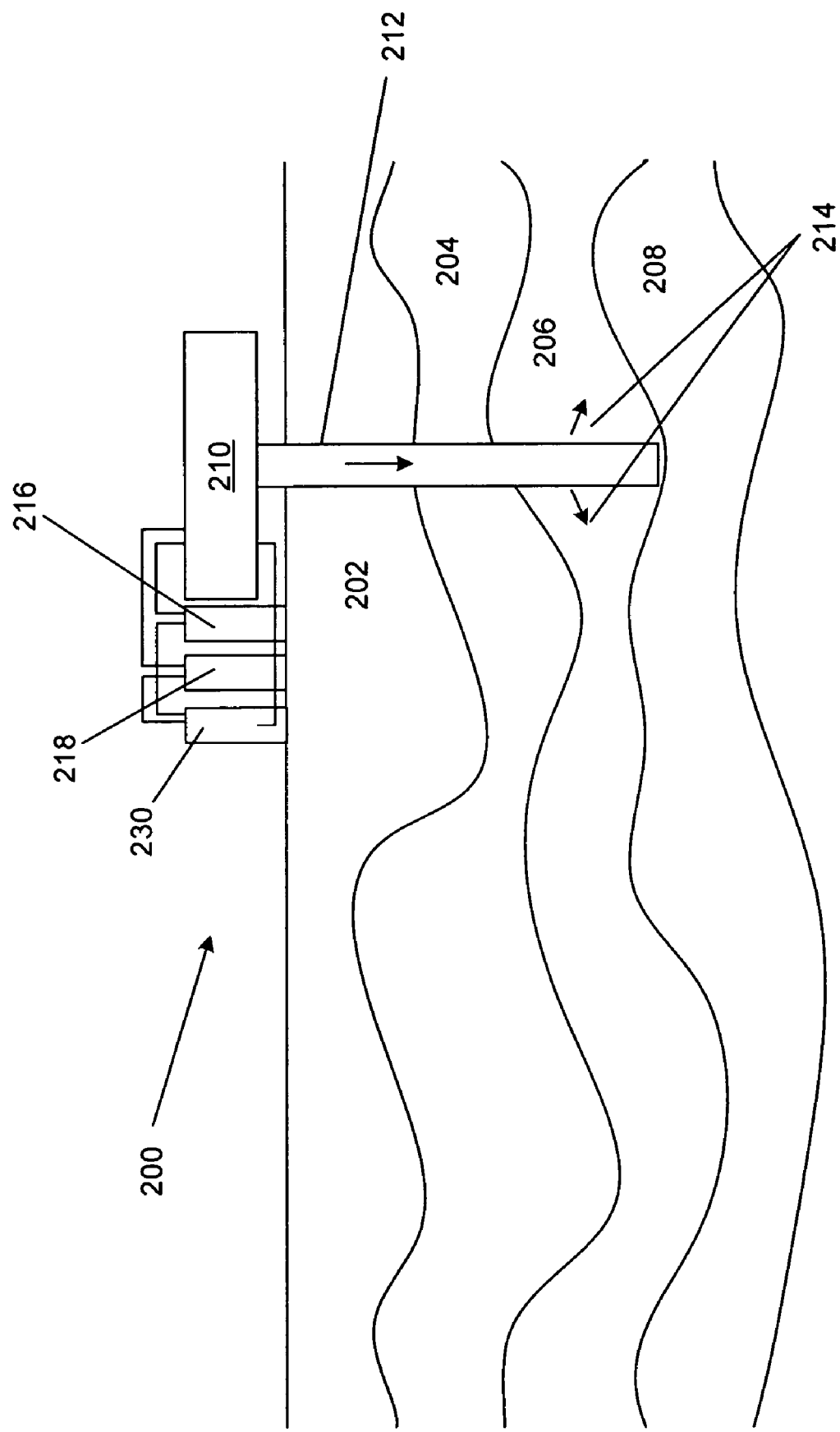

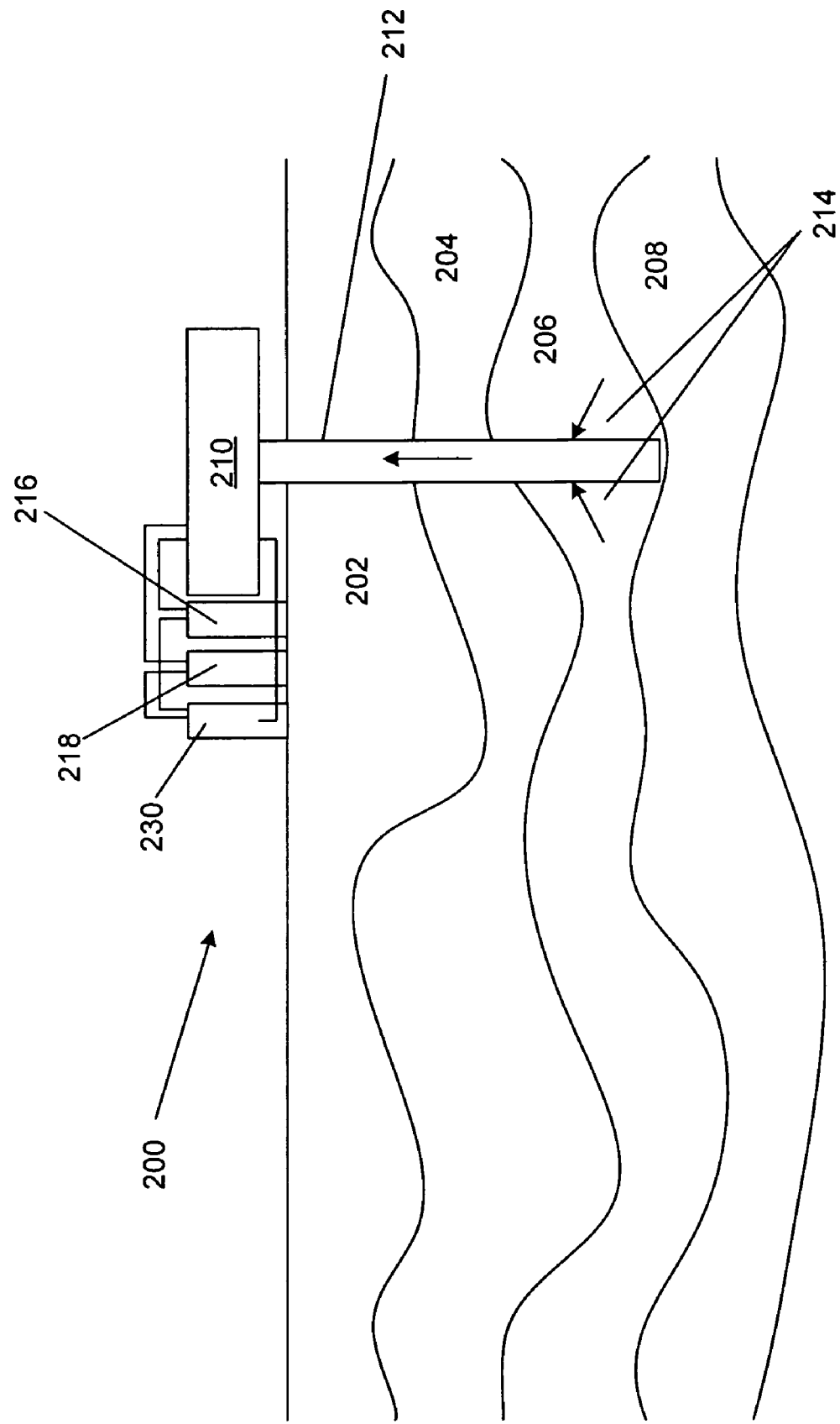

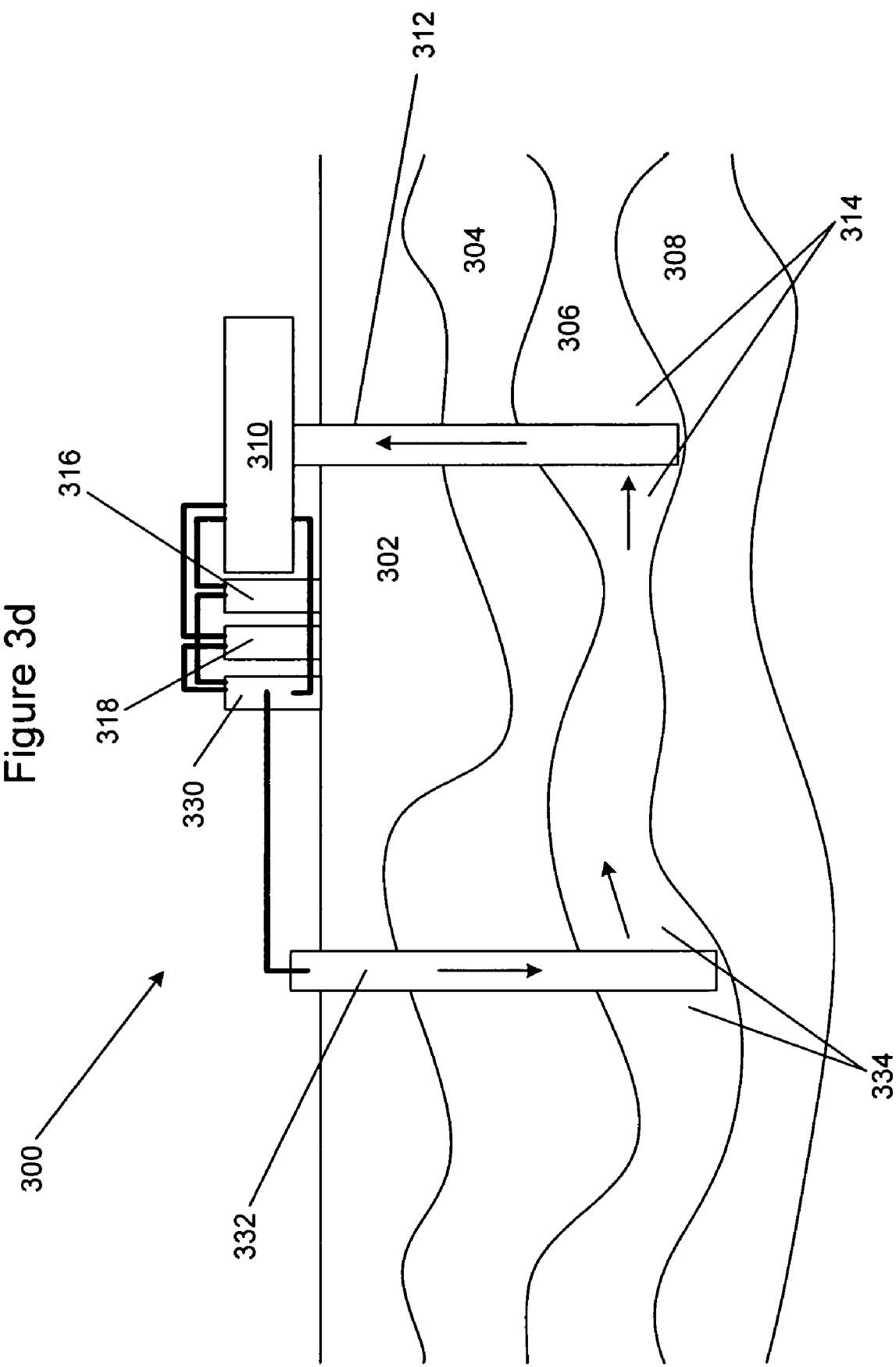

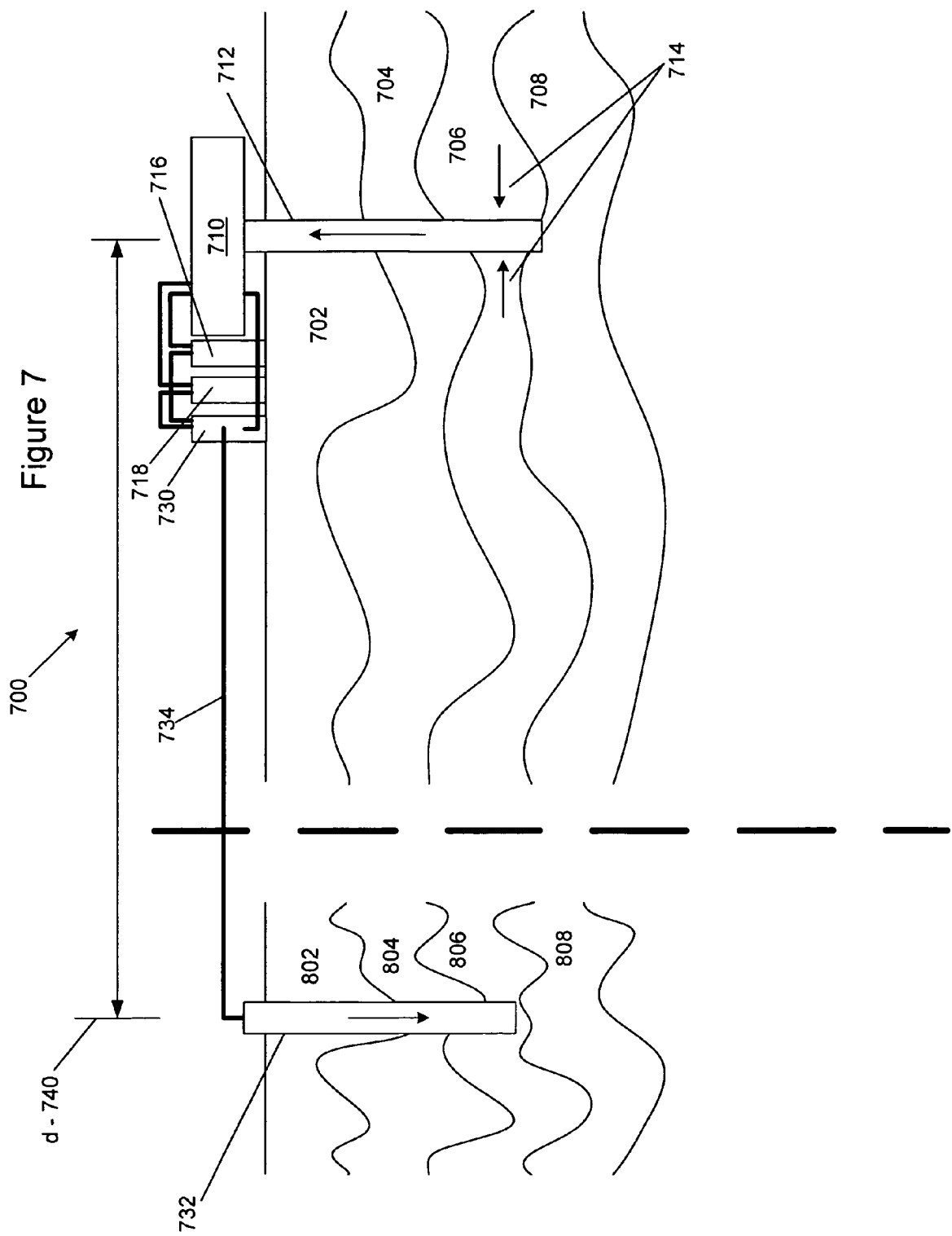

SYSTEMS AND METHODS FOR PRODUCING OIL AND/OR GAS

RELATED APPLICATIONS

This application claims priority to U.S. Provisional Application 60/673,547, filed Apr. 21, 2005; and this application claims priority to U.S. Provisional Application 60/772,691, filed Feb. 13, 2006. U.S. Provisional Application 60/673,547 and U.S. Provisional Application 60/772,691 are herein incorporated by reference in their entirety.

FIELD OF THE INVENTION

The present disclosure relates to systems and methods for producing oil and/or gas.

BACKGROUND OF THE INVENTION

Substantial amounts of sour natural gas are currently being produced from natural gas wells, oil wells (for example, as associated gas), and from natural gas storage reservoirs that have been infected with hydrogen sulfide-producing bacteria. The presence of hydrogen sulfide and other sulfur compounds in fuel and other gases has long been of concern for both the users and the producers of such gases. In addition to the corrosive and other adverse effects that such impurities have upon equipment and processes, noxious emissions are commonly produced from combustion of the natural gas as a result of oxidation of the sulfur compounds. The resulting sulfur oxides can be a major contributor to air pollution and may have detrimental impact upon the environment. Increasingly stringent federal and state regulations have accordingly been promulgated in an effort to reduce or eliminate sulfurous emissions, and a concomitant interest exists in efficiently removing from natural gas and the like the hydrogen sulfide that comprises a significant precursor of noxious emissions. In addition, one method of disposing of hydrogen sulfide has been to convert it into solid sulfur, for storage. Due to environmental and aesthetic concerns, many countries are now outlawing the formation of such sulfur stores.

Enhanced Oil Recovery (EOR) may be used to increase oil recovery in fields worldwide. There are three main types of EOR, thermal, chemical/polymer and gas injection, which may be used to increase oil recovery from a reservoir, beyond what can be achieved by conventional means—possibly extending the life of a field and boosting the oil recovery factor.

Thermal enhanced recovery works by adding heat to the reservoir. The most widely practised form is a steamdrive, which reduces oil viscosity so that it can flow to the producing wells. Chemical flooding increases recovery by reducing the capillary forces that trap residual oil. Polymer flooding improves the sweep efficiency of injected water. Miscible gas injection works in a similar way to chemical flooding. By injecting a fluid that is miscible with the oil, trapped residual oil can be recovered.

Referring to FIG. 1, there is illustrated prior art system 100. System 100 includes underground formation 102, underground formation 104, underground formation 106, and underground formation 108. Production facility 110 is provided at the surface. Well 112 traverses formations 102 and 104, and terminates in formation 106. The portion of formation 106 is shown at 114. Oil and gas are produced from formation 106 through well 112, to production facility 110. Gas and liquid are separated from each other, gas is stored in gas storage 116 and liquid is stored in liquid storage 118. Gas in gas storage 116 may contain hydrogen sulfide, which must be processed, transported, disposed of, or stored.

U.S. Pat. No. 6,149,344 discloses that acid gas, containing hydrogen sulfide, is liquified by compression and cooling, mixed with water under pressure and flowed into a disposal well. U.S. Pat. No. 6,149,344 is herein incorporated by reference in its entirety.

There is a need in the art for improved systems and methods for processing, transportation, disposal, or storage of hydrogen sulfide from a liquid and/or gas. There is a need in the art for improved systems and methods for processing, transportation, disposal, or storage of sulfur from a liquid and/or gas. There is a further need in the art for improved systems and methods for enhanced oil recovery. There is a further need in the art for improved systems and methods for enhanced oil recovery using a sulfur compound, for example through viscosity reduction, chemical effects, and miscible flooding. There is a further need in the art for improved systems and methods for making sulfur containing enhanced oil recovery agents.

In addition, carbon disulfide is a common chemical with applications ranging from use as a commercial solvent to raw material for the production of rayon and agricultural insecticides. The carbon disulfide manufacturing process involves the purchase and transport of both solid sulfur and natural gas (or another carbon source), often from long distances, to the manufacturing site and produces carbon disulfide at very high purity. These two factors—the high purchase and shipping costs of the raw materials, and the high purity of the final product—result in a relatively high production cost for carbon disulfide.

The manufacturing process for converting sour gas into solid sulfur involves a solvent unit to first remove hydrogen sulfide, other sulfur compounds, and contaminants such as carbon dioxide from the natural gas stream, followed by a Claus unit to convert the hydrogen sulfide into sulfur, which is then allowed to solidify prior to transport. The manufacturing process for manufacturing carbon disulfide, on the other hand, entails the heating, melting, and vaporization of solid sulfur and reacting its vapors with heated natural gas or another carbon source.

There is a need in the art for improved systems and methods for converting sour gas to sulfur. There is a need in the art for improved systems and methods for carbon disulfide manufacturing. There is a need in the art for improved systems and methods for more energy efficient carbon disulfide manufacturing.

SUMMARY OF THE INVENTION

In one aspect, the invention provides a system comprising a mechanism for recovering oil and/or gas from an underground formation, the oil and/or gas comprising one or more sulfur compounds; a mechanism for converting at least a portion of the sulfur compounds from the recovered oil and/or gas into a carbon disulfide formulation; and a mechanism for releasing at least a portion of the carbon disulfide formulation into the formation.

In another aspect, the invention provides a method comprising recovering oil and/or gas from an underground formation, the oil and/or gas comprising at least one sulfur compound; converting at least a portion of the sulfur compound from the recovered oil and/or gas into a carbon disulfide formulation; and releasing at least a portion of the carbon disulfide formulation into the formation.

In another aspect, the invention provides a method comprising oxidizing a first portion of a sulfur compound in a first reaction zone to yield sulfur dioxide; reacting at least a portion of the sulfur dioxide with a second portion of sulfur compound in a second reaction zone to yield sulfur; and reacting at least a portion of the sulfur with one or more hydrocarbons in a third reaction zone to yield a carbon disulfide formulation.

In another aspect, the invention provides a system for producing oil and/or gas comprising a mechanism for recovering oil and/or gas from a first underground formation, the oil and/or gas comprising one or more sulfur compounds; a mechanism for converting at least a portion of the sulfur compounds from the recovered oil and/or gas into a carbon disulfide formulation; and a mechanism for releasing at least a portion of the carbon disulfide formulation into a second underground formation.

Advantages of the invention include one or more of the following:

Improved systems and methods for disposing of hydrogen sulfide, sulfur, and/or other sulfur based compounds.

Improved systems and methods for enhanced recovery of hydrocarbons from a formation with a carbon disulfide formulation.

Improved systems and methods for enhanced recovery of hydrocarbons from a formation with a fluid containing a carbon disulfide formulation.

Improved systems and methods for producing a carbon disulfide formulation.

Improved carbon disulfide formulations containing compositions for secondary recovery of hydrocarbons.

Improved systems and methods for processing, transportation, disposal, or storage of a sulfur compound from a liquid and/or gas.

Improved systems and methods for enhanced oil recovery.

Improved systems and methods for enhanced oil recovery using a sulfur compound.

Improved systems and methods for enhanced oil recovery using a compound which is miscible with oil in place.

Improved systems and methods for making and/or using sulfur containing enhanced oil recovery agents.

BRIEF DESCRIPTION OF THE DRAWINGS

FIGS. 3a-3d illustrate oil and/or gas production systems.
FIG. 7 illustrates an oil and/or gas production system.

DETAILED DESCRIPTION OF THE INVENTION

Figure 1:
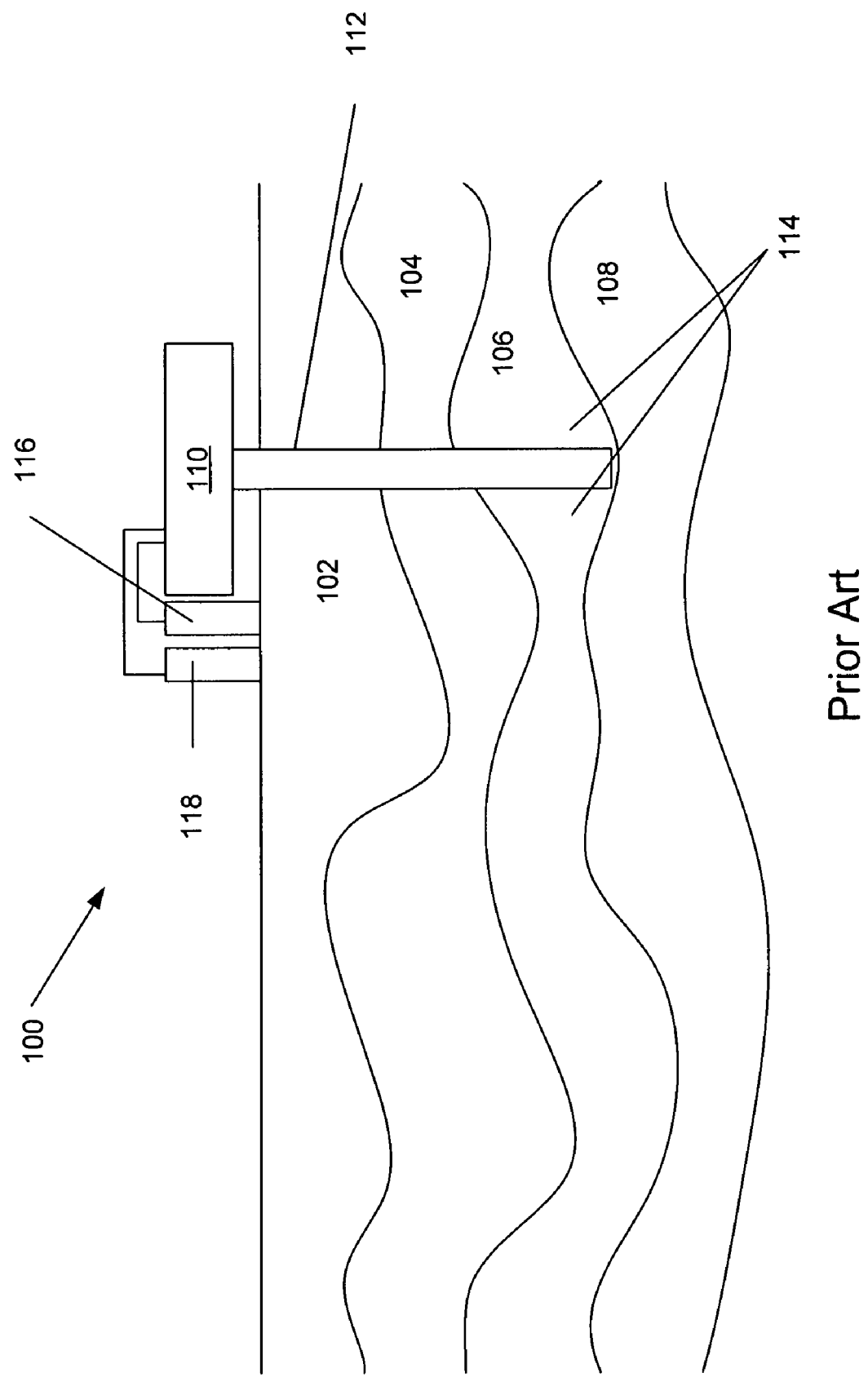
FIG. 1 illustrates an oil and/or gas production system.

In one embodiment of the invention, there is disclosed a system comprising a mechanism for recovering oil and/or gas from an underground formation, the oil and/or gas comprising one or more sulfur compounds; a mechanism for converting at least a portion of the sulfur compounds from the recovered oil and/or gas into a carbon disulfide formulation; and a mechanism for releasing at least a portion of the carbon disulfide formulation into the formation. In some embodiments of the invention, the mechanism for recovering comprises a well in the underground formation and a recovery facility at a topside of the well; the mechanism for converting comprises a converting facility fluidly connected to the recovery facility; and/or the converting facility is adapted to produce the carbon disulfide formulation from at least a portion of the sulfur compound recovered from the well. In some embodiments of the invention, the mechanism for recovering comprises a first well drilled in the underground formation for recovering the oil and/or gas, and a production facility at a topside of the first well; and/or the mechanism for releasing the carbon disulfide formulation comprises a second well in the underground formation for releasing the carbon disulfide formulation into the formation. In some embodiments of the invention, the first well is at a distance of 15 to 2000 meters from the second well, where the range may encompass typical well spacing of known thermal, miscible gas injection, primary and secondary waterflood projects worldwide. Enhanced oil recovery projects may also expand beyond the typical well spacing often tens of kilometers, therefore the range is limited only by the extent of hydrocarbon bearing reservoir in the lateral sense, typically 1 km to 250 km. In some embodiments of the invention, the underground formation is beneath a body of water, and/or the mechanism for converting is floating on the body of water, such as a production platform. In some embodiments of the invention, the system also includes a mechanism for injecting water, the mechanism adapted to inject water into the underground formation after carbon disulfide formulation has been released into the formation. In some embodiments of the invention, the mechanism for recovering comprises at least one well, the at least one well comprising a casing and/or a perforation. In some embodiments of the invention, the mechanism for converting comprises a first reactor for oxidizing a first portion of the sulfur compound to produce sulfur dioxide; a second reactor for reacting a second portion of the sulfur compound with at least a portion of the sulfur dioxide to produce sulfur; and a third reactor for reacting at least a portion of the sulfur with a hydrocarbon to produce a carbon disulfide formulation. In some embodiments of the invention, the first reactor comprises an apparatus for heating at least a portion of the sulfur from the second reactor. In some embodiments of the invention, the system also includes a heat exchanger for transferring heat from at least a portion of the carbon disulfide formulation produced in the third reactor to at least a portion of the hydrocarbon being fed to the third reactor.

In one embodiment of the invention, there is disclosed a method comprising recovering oil and/or gas from an underground formation, the oil and/or gas comprising at least one sulfur compound; converting at least a portion of the sulfur compound from the recovered oil and/or gas into a carbon disulfide formulation; and releasing at least a portion of the carbon disulfide formulation into the formation. In some embodiments of the invention, the method also includes recovering carbon disulfide formulation from the oil and/or gas, if present, and then injecting at least a portion of the recovered carbon disulfide formulation into the formation. In some embodiments of the invention, releasing comprises injecting at least a portion of the carbon disulfide formulation into the formation in a mixture with one or more of air; hydrocarbons; water in the form of liquid and/or vapor; sulfur compounds other than carbon disulfide; carbon dioxide; carbon monoxide; or mixtures thereof. In some embodiments of the invention, the method also includes heating the carbon disulfide formulation prior to injecting the carbon disulfide formulation into the formation, or while within the formation. In some embodiments of the invention, converting the sulfur compound into the carbon disulfide formulation comprises oxidizing at least a portion of the sulfur compound to sulfur, and reacting at least a portion of the sulfur with a hydrocarbon to form the carbon disulfide formulation. In some embodiments of the invention, converting sulfur compound to carbon disulfide formulation comprises oxidizing at least a portion of the sulfur compound into sulfur dioxide, and then converting at least a portion of the sulfur dioxide to sulfur. In some embodiments of the invention, another material is injected into the formation after the carbon disulfide formulation is injected, for example the another material selected from the group consisting of air, water in the form of liquid and/or vapor, carbon dioxide, and/or mixtures thereof. In some embodiments of the invention, the carbon disulfide formulation is injected at a well head pressure range from 0 to 37,000 kilopascals, for example 3,500 kPa to 11,000 kPa. In some embodiments of the invention, oil, as present in the underground formation prior to the injecting the carbon disulfide compound, has an in situ viscosity from 0.14 cp to 6.0 million cp, for example a viscosity from 0.3 cp to 30,000 cp. In some embodiments of the invention, the underground formation comprises an average permeability from 0.0001 to 15 Darcies, for example a permeability from 0.001 to 1 Darcy. In some embodiments of the invention, any oil, as present in the underground formation prior to the injecting the carbon disulfide formulation, has a sulfur content from 0.5% to 5%, for example from 1% to 3%. In some embodiments of the invention, converting at least a portion of the sulfur compound comprises oxidizing a first portion of the sulfur compound with air and/or oxygen to produce sulfur dioxide; reacting the sulfur dioxide with a second portion of the sulfur compound to produce sulfur; and reacting the sulfur with a hydrocarbon to produce a carbon disulfide formulation. In some embodiments of the invention, the method also includes heating the sulfur prior to the reaction with the hydrocarbon. In some embodiments of the invention, the method also includes transferring heat from the produced carbon disulfide formulation to the hydrocarbon being fed to the reaction.

In one embodiment of the invention, there is disclosed a method comprising oxidizing a first portion of a sulfur compound in a first reaction zone to yield sulfur dioxide; reacting at least a portion of the sulfur dioxide with a second portion of sulfur compound in a second reaction zone to yield sulfur; and reacting at least a portion of the sulfur with one or more hydrocarbons in a third reaction zone to yield a carbon disulfide formulation. In some embodiments of the invention, the method also includes heating at least a portion of the sulfur using heat generated in the oxidizing of the sulfur compound. In some embodiments of the invention, the method also includes heat exchanging at least a portion of the carbon disulfide formulation with at least a portion of the hydrocarbons, cooling the carbon disulfide formulation, and heating the hydrocarbons. In some embodiments of the invention, at least a portion of the sulfur leaving the second reaction zone has a temperature from 100° C. to 450° C. In some embodiments of the invention, at least a portion of the sulfur after the heating has a temperature from 450° C. to 1000° C.

In one embodiment of the invention, there is disclosed a system for producing oil and/or gas comprising a mechanism for recovering oil and/or gas from a first underground formation, the oil and/or gas comprising one or more sulfur compounds; a mechanism for converting at least a portion of the sulfur compounds from the recovered oil and/or gas into a carbon disulfide formulation; and a mechanism for releasing at least a portion of the carbon disulfide formulation into a second underground formation. In some embodiments of the invention, the first formation is a distance of less than 1000 kilometers from the second formation, for example less than 250 kilometers. In some embodiments of the invention, the system also includes a fluid connection between the mechanism for converting and the mechanism for releasing. In some embodiments of the invention, the fluid connection comprises a pipe. In some embodiments of the invention, the mechanism for recovering is within a distance of 100 kilometers from the mechanism for converting, for example within a distance of 10 kilometers.

Figure 2:
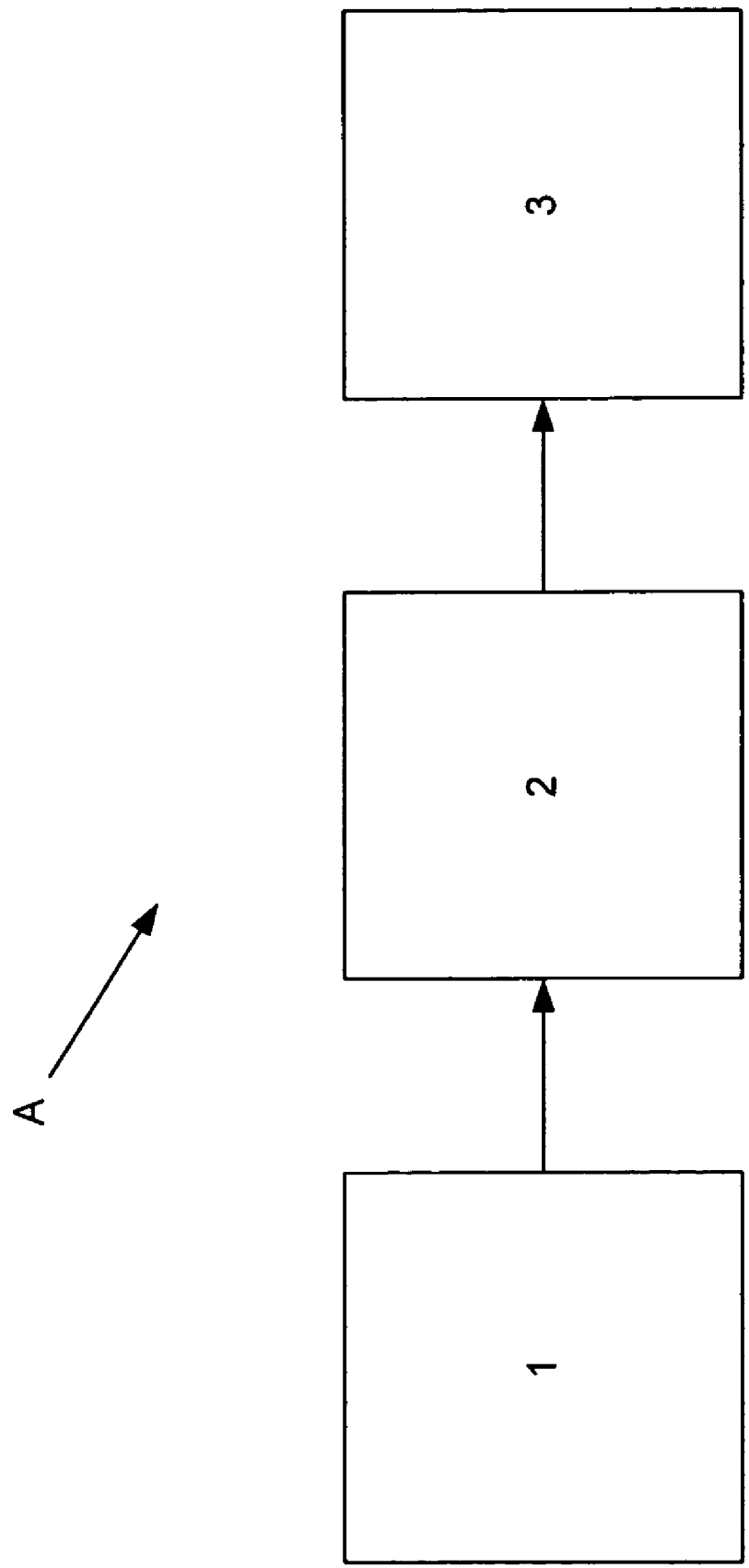
FIG. 2 illustrates an oil and/or gas production process.

Referring now to FIG. 2, in one embodiment of the invention, process A for producing oil and/or gas, which includes disposing of a sulfur compound is illustrated. Process A includes step 1 where oil and/or gas is recovered from an underground formation, the oil and/or gas including a sulfur compound. In step 2, at least a portion of the sulfur compound from the oil and/or gas is converted into a carbon disulfide formulation. In step 3, at least a portion of the carbon disulfide formulation or a mixture comprising a carbon disulfide formulation may be released into a formation.

The recovery of oil and/or gas with a sulfur compound from an underground formation may be accomplished by any known method. Suitable methods include subsea production, surface production, primary, secondary, or tertiary production. The selection of the method used to recover the oil and/or gas from the underground formation is not critical.

In one embodiment, oil and/or gas with a sulfur compound may be recovered from a formation into a well, and flow through the well and flowline to a facility. In some embodiments, enhanced oil recovery, with the use of an agent for example steam, water, a surfactant, a polymer flood, and/or a miscible agent such as a carbon disulfide formulation, may be used to increase the flow of oil and/or gas from the formation.

In some embodiments of the invention, the sulfur compound may include hydrogen sulfide, mercaptans, sulfides and disulfides other than hydrogen disulfide, or heterocyclic sulfur compounds for example thiophenes, benzothiophenes, or substituted and condensed ring dibenzothiophenes, or mixtures thereof.

The conversion of at least a portion of the sulfur compound into a carbon disulfide formulation may be accomplished by any known method. Suitable methods may include oxidation reaction of the sulfur compound to sulfur and/or sulfur dioxides, and by reaction of sulfur and/or sulfur dioxide with carbon and/or a carbon containing compound to form the carbon disulfide formulation. The selection of the method used to convert at least a portion of the sulfur compound into a carbon disulfide formulation is not critical.

In some embodiments of the invention, the carbon disulfide formulation may include carbon disulfide and/or carbon disulfide derivatives for example, thiocarbonates, xanthates and mixtures thereof; and optionally one or more of the following: hydrogen sulfide, sulfur, carbon dioxide, hydrocarbons, and mixtures thereof.

In some embodiments of the invention, carbon disulfide formulation production may have an input of a sulfur compound, for example directly from the formation, or after being separated.

In some embodiments, at least a portion of the sulfur compound may be separated from other gases and/or liquids from the formation, prior to the oxidation process. Suitable separation processes include solvent extraction, using a scavenging agent, liquefying and isolating the sulfur compound by compression and cooling, or other known separation methods. Sulfur compounds recovered from the oil and/or gas may be sent to a carbon disulfide formulation production facility, where the sulfur compounds may be converted to a carbon disulfide formulation.

In some embodiments, the sulfur compound may be removed by solvent extraction, with possible regeneration and recycle of the solvent. Solvents for such extraction include an amine solvent, for example an aqueous solution of secondary and tertiary amine, for example diisopropylamine (DIPA), methyldiethanolamine and triethanolamine (TEA). The oil and/or gas may be contacted with the amine solvent at relatively low temperatures to remove the sulfur compound. This step produces a rich amine portion, loaded with the sulfur compound. This rich amine may be passed to a stripper/regenerator, for example a tray type column. The solvent may then be heated to give off a concentrated sulfur compound gas, leaving a lean amine portion that may be recycled as fresh amine solvent. The sulfur compound rich concentrated acid gas may be routed to the oxidation process. In some embodiments, the sulfur compound may be separated by liquefying the sulfur compound. U.S. Pat. No. 6,149,344 discloses that acid gas, containing hydrogen sulfide, may be liquified by compression and cooling, mixed with water under pressure and flowed into a disposal well. U.S. Pat. No. 6,149,344 is herein incorporated by reference in its entirety.

In some embodiments of the invention, the sulfur compound may be converted into sulfur dioxide and/or sulfur by an oxidation reaction, for example by the Claus process, catalytic selective oxidation reaction, or by reaction with a metal as described hereinafter.

In some embodiments of the invention, the oxidation reaction may include reacting a sulfur compound with an oxygen containing gas in a reaction zone to yield sulfur dioxide and/or sulfur, among other components.

In some embodiments of the invention, the oxygen containing gas may be oxygen, air, oxygen-enriched air, or oxygen depleted air.

In some embodiments of the invention, the sulfur compound may be oxidized in the presence of a catalyst. Suitable catalysts include aluminum, antimony, bismuth, cerium, chromium, cobalt, copper, dysprosium, erbium, europium, gadolinium, gold, hafnium, holmium, iridium, iron, lanthanum, luterium, magnesium, manganese, mixed metals, molybdenum, neodymium, nickel, niobium, osmium, palladium, platinum, praseodymium, promethium, rhenium, rhodium, ruthenium, samarium, scandium, silica, silver, tantalum, technetium, terbium, thulium, titanium, tungsten, vanadium, ytterbium, yttrium, zinc, zirconium, in their elemental form, or as compounds, for example oxides, sulfides, or carbides of the elements, and/or combinations or mixtures of two or more of the above.

In some embodiments of the invention, the catalyst may comprise one or more layers of wire gauze. In some embodiments, the catalyst may comprise a monolith structure or a packed bed of discrete or divided units or structures of the catalyst, for example regularly or irregularly shaped particles, granules, beads, pills, pellets, cylinders, trilobes, extrudates or spheres.

In some embodiments of the invention, the catalyst may be dispersed on a catalyst carrier. Suitable catalyst carriers include acidic mordenite, alumina, aluminum, ceria, chromium, iron, laminar phyllosilicate, lanthanide, samarium, silica, titanium dioxides, yttria, zirconium oxides, other refractory oxides, and/or combinations or mixtures of two or more of the above.

In some embodiments, the catalyst may comprise a vanadium-containing material and a substance selected from scandium, yttrium, lanthanum and samarium and optionally an antimony-containing promoter.

In some embodiments, the catalyst may comprise bismuth oxide supported on alumina.

In some embodiments, the catalyst may comprise an oxide of molybdenum, nickel, manganese, vanadium, and/or chromium supported on titanium dioxide.

In some embodiments, the catalyst may comprise a multi-component catalyst containing antimony, vanadium and magnesium materials.

In some embodiments, the catalyst may comprise a mixed metal catalyst containing vanadium in combination with molybdenum or magnesium.

In some embodiments, the catalyst may comprise an iron and zinc oxide supported on silica.

In some embodiments, the catalyst may comprise both bismuth and vanadium oxides and/or $V_2O_5$ supported on acidic mordenite or alumina.

In some embodiments, the catalyst may comprise a vanadium oxide or sulfide catalyst supported on a non-alkaline porous refractory oxide.

In some embodiments, the catalyst may comprise a mixed metal oxide catalyst containing titania, for example where the catalyst may contain from 0.1 to 25% by weight nickel oxide and from 0 to 10% by weight aluminum oxide (where the percentages are based on the supported catalyst).

In some embodiments, the catalyst may comprise a mixture of two or more of platinum, rhodium, nickel, palladium, ruthenium, and iridium, for example a platinum-rhodium mixture. In some embodiments the mixture may also contain a lanthanide metal or metal oxide. The mixture may be supported on a lanthanide, for example samarium, coated refractory support.

In some embodiments of the invention, the oxidation reaction may take place in a reaction zone having a temperature of less than about 500° C., for example from about 150 to about 500° C., or from about 200 to about 300° C., or above the dew point of sulfur, for given process conditions, so that sulfur does not condense onto the catalyst or in the reaction zone.

In some embodiments of the invention, the oxidation reaction may take place in a reaction zone having a pressure from about 100 to about 1000 kilopascals, for example from about 200 to about 500 kilopascals (absolute).

In some embodiments of the invention, the contact time between the catalytic surfaces of the catalyst and the sulfur compound may be maintained from about 1 to about 200 milliseconds, for example from about 5 to about 50 milliseconds, or from about 10 to about 20 milliseconds.

In some embodiments, a sulfur compound may be converted to sulfur and/or sulfur dioxide, for which processes are disclosed in U.S. patent application publication Nos. 2004/0096381, 2004/0022721, 2004/0159583, 2003/0194366, 2001/0008619, 2002/0134706, 2004/0096381, 2004/0022721, 2004/0159583, and 2001/0008619, the disclosures of which are herein incorporated by reference in their entirety.

In some embodiments, when the sulfur compound is hydrogen sulfide, the hydrogen sulfide may converted into sulfur by the following reaction sequence:

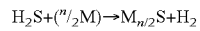

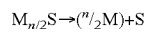

where M represents a suitable metal, for example iron, cobalt, nickel, bismuth or molybdenum. This two-step reaction sequence for producing sulfur is disclosed in Chang's U.S. Pat. No. 4,543,434, which is herein incorporated by reference in its entirety.

In some embodiments of the invention, oxidation reaction products, for example sulfur and/or sulfur dioxide, may be removed from the reaction zone, by techniques known in the art. For liquid reaction mixtures, oxidation reaction products may be removed by distillation or stripping. For gaseous reaction mixtures, oxidation reaction products may be removed by solvent extraction using an aqueous amine solution or an alkaline solution, or by absorption on copper, barium or cerium oxide.

Sulfur and/or sulfur dioxide may be reacted with carbon or a carbon containing compound in a reaction zone to produce a carbon disulfide formulation. In some embodiments, the products, for example carbon disulfide formulation and other sulfur compounds, may be separated into carbon disulfide formulation and sulfur compound portions, and the sulfur compound portion recycled to be oxidized and/or combined with a carbon compound.

In some embodiments, the carbon compound comprises carbon in any form, for example graphite, coal, charcoal, carbon monoxide, hydrocarbons for example natural gas, methane, ethane, propane, or heavier hydrocarbons.

In some embodiments, sulfur and/or sulfur dioxide may be combined with a carbon compound at temperatures from about 500 to about 900° C., for example from about 550 to 700° C.

In some embodiments, sulfur and/or sulfur dioxide may be combined with a carbon compound at a pressure from about 100 to about 500 kilopascals.

In some embodiments, a carbon disulfide formulation generation may take place by the Folkins process, for example as disclosed at pages 747-749 of the Kirk-Othmer Encyclopedia of Chemical Technology, Third Edition, Vol. 4, 1978, herein incorporated by reference.

In some embodiments, an excess of sulfur and/or sulfur dioxide (e.g. 10-15% stoichiometric excess) may be used with respect to the carbon compound.

In some embodiments, the carbon compound may be fed countercurrent to the sulfur and/or sulfur dioxide so that the components may collide head-on.

In some embodiments, sulfur and/or sulfur dioxide may be combined with a carbon compound in the presence of a catalyst. Suitable catalysts include silica-alumina catalysts, for example those containing from 2 to 10 percent by weight of silica; silica gel; fuller's earth; bauxite; activated alumina; and in general those types of clay which are effective in the removal of color bodies and gum forming bodies from petroleum oils. The catalysts may additionally comprise one or more of vanadium, niobium, tantalum, chromium, molybdenum, tungsten, manganese, technetium, rhenium, iron, ruthenium, osmium, cobalt, rhodium, iridium, nickel, palladium, and/or platinum; in their elemental form, as compounds of the metals, or as oxides and sulfides. For example, oxides and sulfides of iron, vanadium, chromium, molybdenum, and manganese may be used as promoters in combination with silica gel, fuller's earth and/or activated alumina catalysts.

In some embodiments, the product from the reaction zone may be heat exchanged with the carbon compound, to cool the product and to heat the carbon compound.

In some embodiments, sulfur dioxide and carbon monoxide may be reacted to form a carbon disulfide formulation. The process may include a first reaction step wherein sulfur dioxide and carbon monoxide are reacted in the presence of a catalyst to form carbonyl sulfide and carbon dioxide. In a second reaction step, the carbonyl sulfide may be converted over a catalyst to carbon disulfide formulation and carbon dioxide in a disproportionation reaction. The reactions can be represented by the following equations:

$$3CO+SO_2 \rightarrow COS+2CO_2$$

$$2COS \rightarrow CS_2+CO_2$$

These two equations can be combined to give the following equation which may represent the overall process.

$$6CO+2SO_2 \rightarrow CS_2+5CO_2$$

The reaction may be driven to completion by removal of the carbon disulfide formulation. The first reaction step may be promoted by a catalyst of the type containing a reducible metal oxide, for example chromium promoted iron catalyst, nickel-molybdenum, cobalt-molybdenum, molybdenum or any combination thereof. The first reaction is highly exothermic. A substantial quantity of heat may be removed from the reaction to control the temperature. The reaction may be conducted in a shell-and-tube reactor, a fluidized bed reactor, or a molten salt reactor. The heat that is recovered from this first reaction step may be advantageously used in the second step or other parts of the process. The second reaction step may be reversible. Carbon disulfide formulation may be recovered from the reactor effluent and the unreacted carbonyl sulfide recycled. Alternatively, carbon disulfide formulation may be continuously removed by absorption in a solvent, for example in a reactor-absorber column. The column may contain catalyst particles which also serve as the tower packing. Thus, the catalyst not only promotes the reaction but in addition may provide the surface area for contact between the liquid absorbent and the gas phase. The exit gases from the first reaction step may be fed to the bottom of the reactor-absorber column. This gas may contain carbonyl sulfide. As the gas passes up through the column, carbonyl sulfide may be converted to carbon disulfide formulation and carbon dioxide. The carbon disulfide formulation may be continuously absorbed in a solvent, which flows down the column. Thus, as the gases continue to pass up through the column, the concentration of carbonyl sulfide declines and approaches zero, leaving only carbon dioxide. The solvent, which exits the bottom of the column impregnated with carbon disulfide formulation, may be regenerated in a stripper column and recycled back to the reactor-absorber column. High void fractions may be used to minimize flooding in countercurrent flow operations. Catalysts for the decomposition of carbonyl sulfide to carbon disulfide formulation and carbon dioxide may include activated alumina, silica-alumina, quartz, glass, titania and alumina-titania composites, and/or kaolin. The absorbent may be a good solvent for carbon disulfide formulation, have a low vapor pressure, and/or be stable at elevated temperatures, for example synthetic organic fluids and silicone oils. Temperatures from about 50 to about 250° C. may be used with pressure in the range of 100 to 1000 kilopascals.

In some embodiments, a carbon disulfide formulation may be produced by reacting elemental carbon with sulfur. Elemental carbon may be obtained from methane, which may be thermally decomposed to carbon and hydrogen in the absence of oxygen or oxygen-containing compounds, to ensure that no methane conversion to oxygenates can take place. The hydrogen may be collected for separate use. The heat required for this decomposition reaction could be supplied in any desirable form. It is possible that a catalytic surface may be used to enhance the decomposition reaction and thus reduce the fuel requirements of the reaction. Sulfur may be reacted with the freshly generated carbon so as to produce carbon disulfide formulation, for example, sulfur in the vapor phase may be used for this reaction. The methane decomposition reaction and the reaction with sulfur may both take place in the same reaction zone, wherein elemental carbon may be deposited on a solid surface as a product of the decomposition reaction. After the carbon deposited by the decomposition reaction is removed from the reactor by the reaction with sulfur, the introduction of sulfur may be stopped and the cycle of methane decomposition restarted. The decomposition reaction and the reaction with sulfur could also be conducted with a carrier solid in transported bed or fluidized bed reactor systems.

In some embodiments, sulfur and/or sulfur dioxide and a carbon compound may be converted to carbon disulfide formulation, processes for which are disclosed in U.S. Pat. Nos. 4,963,340, 2,636,810, 3,927,185, 4,057,613, and 4,822,938, and U.S. patent application publication No. 2004/0146450, the disclosures of which are herein incorporated by reference in their entirety.

In some embodiments of the invention, carbon monoxide may be reacted with sulfur dioxide to form carbon disulfide formulation, a process for which is disclosed in U.S. patent application publication No. 2004/0146450, the disclosure of which is herein incorporated by reference in its entirety.

In some embodiments to accomplish Step 2, carbon disulfide formulation may be reacted with other chemicals to form carbon disulfide derivatives, for example thiocarbonates, xanthates, and/or dithiocarbamates, as described in U.S. Pat. Nos. 4,476,113 and 5,076,358, which are herein incorporated by reference in their entirety.

Releasing at least a portion of the carbon disulfide formulation and/or other liquids and/or gases may be accomplished by any known method. One suitable method is injecting carbon disulfide formulation into a single conduit in a single well, allowing carbon disulfide formulation to soak, and then pumping out at least a portion of the carbon disulfide formulation with gas and/or liquids. Another suitable method is injecting carbon disulfide formulation into a first conduit in a single well, and pumping out at least a portion of the carbon disulfide formulation with gas and/or liquids through a second conduit in the single well. Another suitable method is injecting carbon disulfide formulation into a first well, and pumping out at least a portion of the carbon disulfide formulation with gas and/or liquids through a second well. The selection of the method used to inject at least a portion of the carbon disulfide formulation and/or other liquids and/or gases is not critical.

Carbon disulfide formulation and/or other liquids and/or gases may be left to soak in a formation for a period of time from about 1 hour to about 15 days, for example from about 5 to about 50 hours.

In some embodiments, carbon disulfide formulation and/or other liquids and/or gases may be pumped into a formation at a pressure above the fracture pressure of the formation.

In some embodiments, carbon disulfide formulation or carbon disulfide formulation mixed with other components may be miscible in oil (or other liquids) and/or gases in a formation. In some embodiments, carbon disulfide formulation or carbon disulfide formulation mixed with other components may be immiscible in oil and/or gas in formation.

In some embodiments, carbon disulfide formulation or carbon disulfide formulation mixed with other components may be mixed in with oil and/or gas in a formation to form a mixture which may be recovered from a well. In some embodiments, carbon disulfide formulation or carbon disulfide formulation mixed with other components may not mix in with oil and/or gas in formation, so that carbon disulfide formulation or carbon disulfide formulation mixed with other components travels as a plug across the formation to force oil and/or gas to the well. In some embodiments, a quantity of carbon disulfide formulation or carbon disulfide formulation mixed with other components may be injected into a well, followed by another component to force carbon disulfide formulation or carbon disulfide formulation mixed with other components across the formation. For example air, water in liquid or vapor form, carbon dioxide, other gases, other liquids, and/or mixtures thereof may be used to force carbon disulfide formulation or carbon disulfide formulation mixed with other components across the formation.

In some embodiments, carbon disulfide formulation, for example thiocarbonate compounds, may be dissolved in water, and the resulting solution pumped into a formation. The dissolved thiocarbonate compounds may decompose, yielding carbon disulfide in the formation.

In some embodiments to accomplish Step 3, carbon disulfide formulation is combined with one or more hydrocarbons: such as an aromatic, for example, benzene, toluene, or xylene; chlorinated hydrocarbons, for example, carbon tetrachloride or methylene chloride; other $C_5$-$C_{15}$ hydrocarbons, such as gasoline; diesel; mineral oils other naphthenic or paraffinic hydrocarbons; water or steam; or other sulfur compounds, for example, hydrogen sulfide, and then injected into a formation for enhanced oil recovery. For example, a mixture of carbon disulfide formulation, hydrogen sulfide, and water may be injected into a formation.

In some embodiments, carbon disulfide formulation or a carbon disulfide formulation mixture may be injected into a formation, produced from the formation, and then separated from the recovered oil and/or gas, for example, by boiling and then condensing, then the carbon disulfide formulation or carbon disulfide formulation mixture may be re-injected into the formation.

In some embodiments, carbon disulfide formulation or a carbon disulfide formulation mixture may be heated prior to being injected into the formation to lower the viscosity of fluids in the formation, for example heavy oils, paraffins, asphaltenes, etc.

In some embodiments, carbon disulfide formulation or a carbon disulfide formulation mixture may be heated and/or boiled while within the formation, with the use of a heated fluid or a heater, to lower the viscosity of fluids in the formation. In some embodiments, heated water and/or steam may be used to heat and/or vaporize the carbon disulfide formulation in the formation. Alternatively, a nonaqueous fluid could be substituted for steam or hot water as the heat medium to vaporize carbon disulfide formulation, for example a heavy aromatic solvent which may have its own solubilizing effect on reservoir hydrocarbons.

In some embodiments, carbon disulfide formulation may be removed from the recovered crude and other liquids by physical separation processes, so that the carbon disulfide formulation may be reused again leaving the crude substantially free of carbon disulfide formulation.

Referring now to FIG. 3*a*, in one embodiment of the invention, system 200 is illustrated. System 200 includes underground formation 202, underground formation 204, underground formation 206, and underground formation 208. Production facility 210 is provided at the surface. Well 212 traverses formations 202 and 204, and has openings in formation 206. Portions 214 of formation 206 may optionally be fractured and/or perforated. Oil and gas from formation 206 is produced into portions 214, into well 212, and travels up to production facility 210. Production facility may then separate gas, which is sent to gas processing 216, and liquid, which is sent to liquid storage 218. Production facility also includes carbon disulfide formulation production 230. Hydrogen sulfide and/or other sulfur containing compounds produced from well 212 may be sent to carbon disulfide formulation production 230. Carbon disulfide formulation is returned back down well 212 that is shown by the down arrow and is pumped into formation 206, and is then produced with oil and gas back up well 212 to production facility 210. Production facility 210 is adapted to recycle carbon disulfide formulation, for example by boiling the carbon disulfide formulation, condensing it or filtering or reacting it, then re-injecting the carbon disulfide formulation into well 212.

Referring now to FIGS. 3b and 3c, in some embodiments of the invention, system 200 is illustrated. System 200 includes underground formation 202, underground formation 204, underground formation 206, and underground formation 208. Production facility 210 is provided at the surface. Well 212 traverses formations 202 and 204, and has openings in formation 206. Portions 214 of formation 206 may be optionally fractured and/or perforated. During primary production, oil and gas from formation 206 is produced into portions 214, into well 212, and travels up to production facility 210. Production facility then separates gas, which is sent to gas processing 216, and liquid, which is sent to liquid storage 218. Production facility also includes carbon disulfide formulation production 230. Hydrogen sulfide and/or other sulfur containing compounds produced from well 212 may be sent to carbon disulfide formulation production 230. As shown in FIG. 3b, carbon disulfide formulation may be pumped down well 212 that is shown by the down arrow and pumped into formation 206. Carbon disulfide formulation may be left to soak in formation for a period of time from about 1 hour to about 15 days, for example from about 5 to about 50 hours.

After the soaking period, as shown in FIG. 3c, carbon disulfide formulation and oil and/or gas is then produced back up well 212 to production facility 210. Production facility 210 is adapted to separate and/or recycle carbon disulfide formulation, for example by boiling the carbon disulfide formulation, condensing it or filtering or reacting it, then re-injecting the carbon disulfide formulation into well 212, for example by repeating the soaking cycle shown in FIGS. 3b and 3c from about 2 to about 5 times.

In some embodiments, carbon disulfide formulation may be pumped into formation 206 above the fracture pressure of the formation, for example from about 120% to about 200% of the fracture pressure.

Referring now to FIG. 3d, in some embodiments of the invention, system 300 is illustrated. System 300 includes underground formation 302, formation 304, formation 306, and formation 308. Production facility 310 is provided at the surface. Well 312 traverses formation 302 and 304 has openings at formation 306. Portions of formation 314 may be optionally fractured and/or perforated. As oil and gas is produced from formation 306 it enters portions 314, and travels up well 312 to production facility 310. Gas and liquid may be separated, and gas may be sent to gas storage 316, and liquid may be sent to liquid storage 318. Production facility 310 is able to produce carbon disulfide formulation, which may be produced and stored in carbon disulfide formulation production 330. Hydrogen sulfide and/or other sulfur containing compounds from well 312 may be sent to carbon disulfide formulation production 330. Carbon disulfide formulation is pumped down well 332, to portions 334 of formation 306. Carbon disulfide formulation traverses formation 306 to aid in the production of oil and gas, and then the carbon disulfide formulation, oil and/or gas may all be produced to well 312, to production facility 310. Carbon disulfide formulation may then be recycled, for example by boiling the carbon disulfide formulation, condensing it or filtering or reacting it, then re-injecting the carbon disulfide formulation into well 332.

In some embodiments, carbon disulfide formulation or carbon disulfide formulation mixed with other components may be miscible in oil and/or gas in formation 306.

In some embodiments, carbon disulfide formulation or carbon disulfide formulation mixed with other components may be immiscible in oil and/or gas in formation 306.

In some embodiments, carbon disulfide formulation or carbon disulfide formulation mixed with other components may be mixed in with oil and/or gas in formation 306 to form a miscible mixture which is produced to well 312.

In some embodiments, carbon disulfide formulation or carbon disulfide formulation mixed with other components may not mix in with oil and/or gas in formation 306, so that carbon disulfide formulation or carbon disulfide formulation mixed with other components travels as a plug across formation 306 to force oil and/or gas to well 312. In some embodiments, a quantity of carbon disulfide formulation or carbon disulfide formulation mixed with other components may be injected into well 332, followed by another component to force carbon disulfide formulation or carbon disulfide formulation mixed with other components across formation 306, for example air; water in gas or liquid form; water mixed with one or more salts, polymers, and/or surfactants; carbon dioxide; other gases; other liquids; and/or mixtures thereof.

Figure 4:
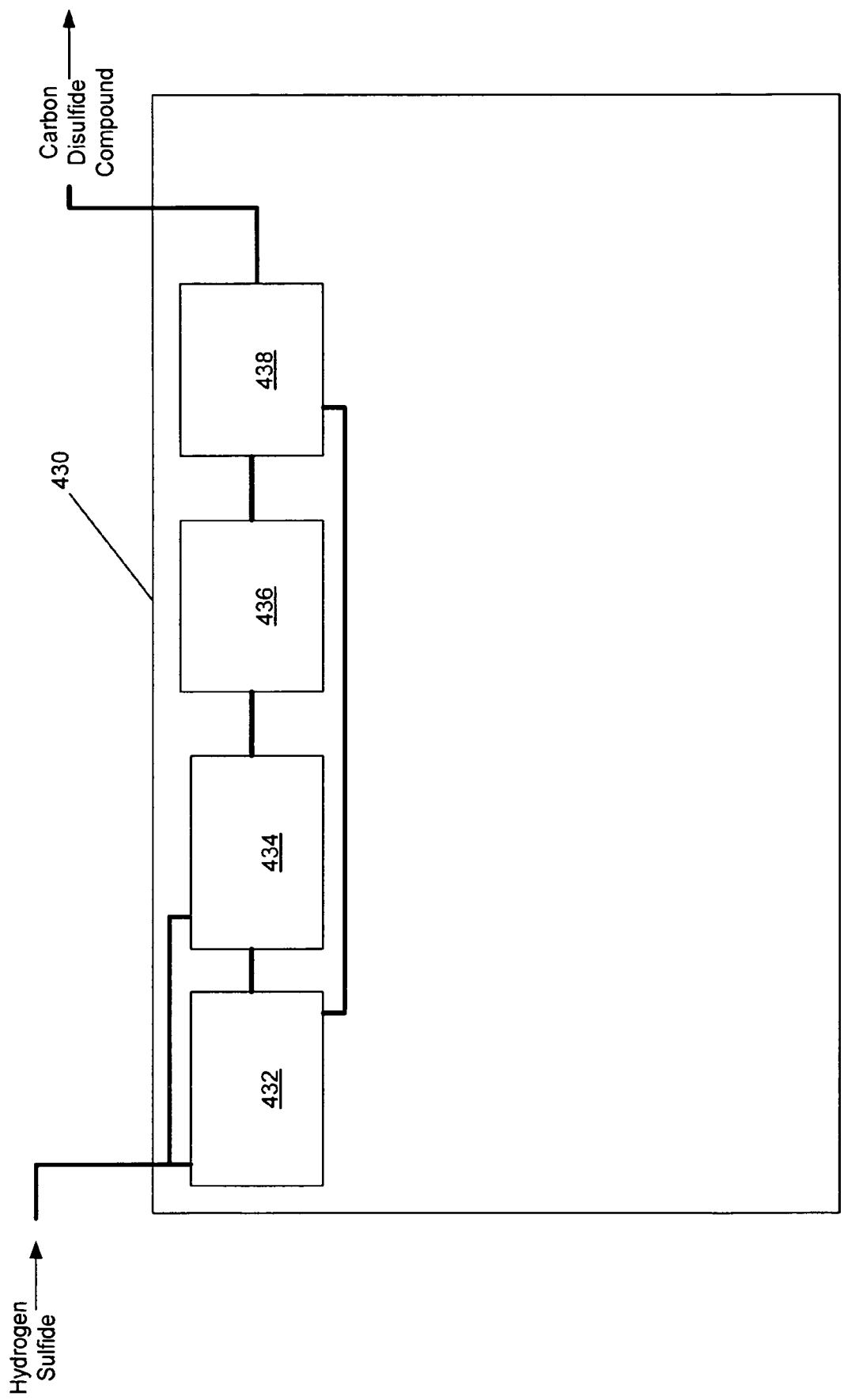
FIG. 4 illustrates a carbon disulfide formulation production process.

Referring now to FIG. 4, in some embodiments of the invention, carbon disulfide formulation production 430 is illustrated. Carbon disulfide formulation production 430 has an input of hydrogen sulfide and/or other sulfur containing compounds, for example from a separation step, as discussed above. Hydrogen sulfide may be converted into sulfur dioxide by oxidation reaction 432. Hydrogen sulfide and sulfur dioxide may be converted to sulfur at 434. Sulfur may be combined with a carbon compound to produce carbon disulfide formulation at 436. In some embodiments, at 438, carbon disulfide formulation and hydrogen sulfide produced at 436 may be separated into carbon disulfide formulation and hydrogen sulfide portions, and the hydrogen sulfide recycled to oxidation reaction 432. In some embodiments, 438 may be omitted, and the carbon disulfide formulation and hydrogen sulfide produced at 436 may be the output. Carbon disulfide formulation and/or a carbon disulfide formulation containing mixture may be the output from carbon disulfide formulation production 430.

Figure 5:
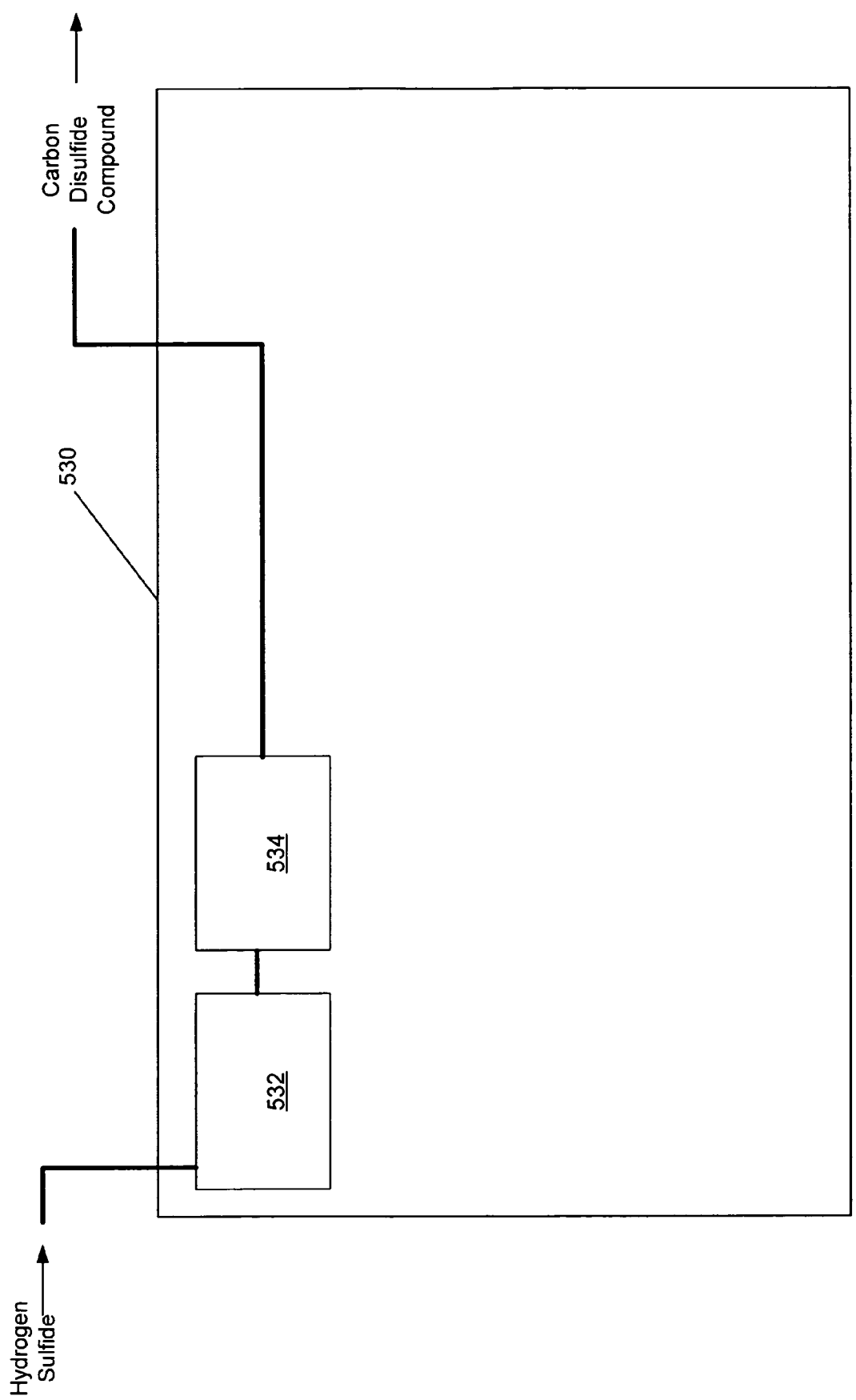
FIG. 5 illustrates a carbon disulfide formulation production process.

Referring now to FIG. 5, in some embodiments of the invention, carbon disulfide formulation production 530 is illustrated. Production 530 includes oxidation reaction of hydrogen sulfide and/or other sulfur containing compounds into sulfur dioxide at 532, for example by the Claus process, or catalytic selective oxidation reaction, as discussed above. At 534, carbon monoxide may be reacted with sulfur dioxide to form carbon disulfide formulation, a process for which is disclosed in U.S. patent application publication No. 2004/0146450, the disclosure which is herein incorporated by reference in its entirety.

Figure 6:
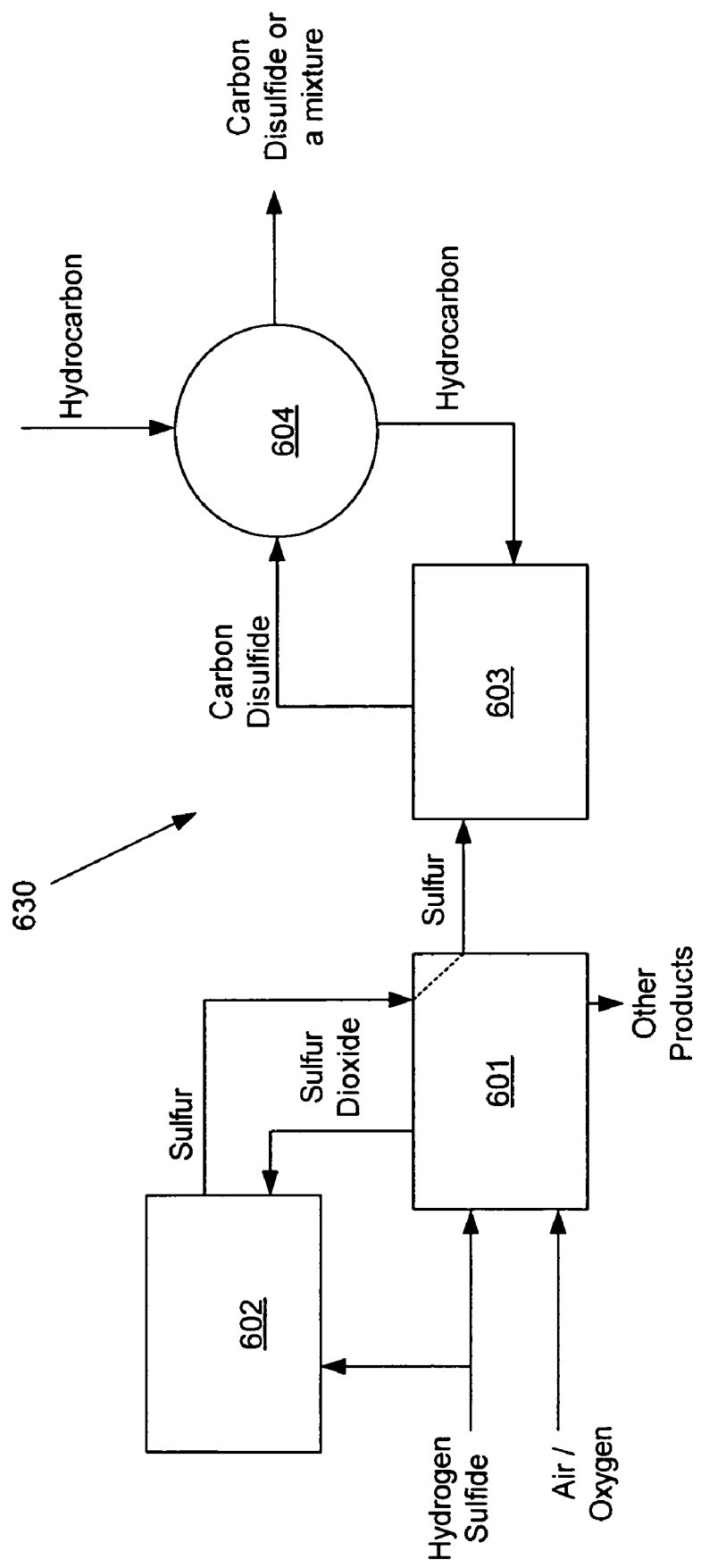
FIG. 6 illustrates a carbon disulfide formulation production process.

Referring now to FIG. 6, in some embodiments of the invention, carbon disulfide formulation production system 600 is illustrated. A portion of hydrogen sulfide and/or other sulfur containing compounds may be burned with oxygen and/or air in furnace 601 to yield sulfur dioxide, among other components, and a large amount of heat. The sulfur dioxide may be fed to reactor 602, for example a Claus Reactor or multiple Claus Reactors in series, and reacted with a different portion of hydrogen sulfide to yield sulfur, for example a low temperature sulfur, for example sulfur having a temperature less than about 445° C., the normal boiling point of sulfur. The temperature of this sulfur portion may be increased by applying heat from furnace 601 to yield a higher-temperature sulfur portion, for example sulfur having a temperature above about 445° C. The sulfur portion may then be combined with a hydrocarbon portion in carbon disulfide formulation reactor 603, yielding carbon disulfide formulation, among other components for example carbon dioxide, sulfur dioxide and/or hydrogen sulfide. This carbon disulfide formulation portion may be passed through heat-exchanger 604 to cool carbon disulfide formulation portion and to warm hydrocarbon portion, for example to transfer heat from carbon disulfide formulation portion to hydrocarbon portion.

Referring now to FIG. 7, in some embodiments of the invention, system 700 is illustrated. System 700 includes underground formation 702, formation 704, formation 706, and formation 708; and underground formation 802, formation 804, formation 806, and formation 808. Production facility 710 is provided at the surface. Well 712 traverses formation 702 and 704 has openings at formation 706. Portions of formation 714 may be optionally fractured and/or perforated. As oil and gas is produced from formation 706 it enters portions 714, and travels up well 712 to production facility 710. Gas and liquid may be separated, and gas may be sent to gas storage 716, and liquid may be sent to liquid storage 718. Production facility 710 is able to produce carbon disulfide formulation, which may be produced and stored in carbon disulfide formulation production 730. Hydrogen sulfide and/or other sulfur containing compounds from well 712 may be sent to carbon disulfide formulation production 730. Carbon disulfide formulation is transported to well 732 by pipe 734 and pumped down well 732, to formation 806. Carbon disulfide formulation may be used in formation 806 to aid in the production of oil and gas from formation 806.

Well 732 is separated from well 712 by a distance d 740. In some embodiments, distance d 740 is from about 1 to about 1000 kilometers, for example from about 5 to about 250 kilometers, or for example from about 10 to about 100 kilometers, or for example about 50 to 75 kilometers.

In some embodiments, carbon disulfide derived salts can be dissolved in water, and the resulting solution pumped into formations 206, 306 and/or 806. The dissolved carbon disulfide formulations may decompose, yielding carbon disulfide in formations 206, 306 and/or 806.

In some embodiments of the invention, gas and liquid produced from well 212, 312 and/or 712 may be separated, for example with a gravity separator or a centrifuge, or with other methods known in the art. The gas portion may be sent to carbon disulfide formulation production 230, 330 and/or 730.

In some embodiments of the invention, a gas portion containing hydrogen sulfide from well 212, 312 and/or 712 may be sent to carbon disulfide formulation production 230, 330 and/or 730, to undergo catalytic selective oxidation reaction 432 and/or 532 of the sulfur compounds by: contacting the gas portion and a molecular-oxygen containing gas, converting the sulfur containing components in the gas portion to sulfur dioxide, and then optionally removing the thus-formed sulfur dioxide from the gas portion.

In some embodiments of the invention, all of the components of system 200 and/or system 300 may be within about 10 km of each other, for example about 5, 3, or 1 km.

In some embodiments, oil and/or gas produced from well 212, 312 and/or 712 may be transported to a refinery and/or a treatment facility. The oil and/or gas may be processed to produced to produce commercial products such as transportation fuels such as gasoline and diesel, heating fuel, lubricants, chemicals, and/or polymers. Processing may include distilling and/or fractionally distilling the oil and/or gas to produce one or more distillate fractions. In some embodiments, the oil and/or gas, and/or the one or more distillate fractions may be subjected to a process of one or more of the following: catalytic cracking, hydrocracking, hydrotreating, coking, thermal cracking, distilling, reforming, polymerization, isomerization, alkylation, blending, and dewaxing.

It is to be appreciated that any of the embodiments to complete Step 1 may be combined with any of the embodiments to complete Step 2, which may be combined with any of the embodiments to complete Step 3.

The selection of a method to complete any of Steps 1-3 is not critical. For example, Step 1 may be completed with facility 210 and well 212 as shown in FIG. 3a, Step 2 may be completed by the carbon disulfide formulation production 630 shown in FIG. 6, and Step 3 may be completed by facility 210 and well 212 as shown in FIG. 3a. Alternatively, Steps 1 and/or 3 may be completed by facility 210 and well 212 as shown in FIGS. 3b and 3c; or facility 310 and wells 312 and 332 as shown in FIG. 3d. Similarly, Step 2 may be completed by any known method. Lastly, Step 2 may be completed by the carbon disulfide formulation production 430 shown in FIG. 4, carbon disulfide formulation production 530 shown in FIG. 5, or any other known carbon disulfide formulation production method.

Those of skill in the art will appreciate that many modifications and variations are possible in terms of the disclosed embodiments of the invention, configurations, materials and methods without departing from their spirit and scope. Accordingly, the scope of the claims appended hereafter and their functional equivalents should not be limited by particular embodiments described and illustrated herein, as these are merely exemplary in nature.

The invention claimed is:

1. A system for producing oil and/or gas comprising:
   a first well comprising a mechanism for recovering oil and/or gas from a first underground formation, the oil and/or gas comprising one or more sulfur compounds;
   a mechanism for converting at least a portion of the sulfur compounds from the recovered oil and/or gas into a carbon disulfide formulation; and
   a second well comprising a mechanism for releasing at least a portion of the carbon disulfide formulation into a second underground formation.

2. The system of claim 1, wherein the first formation is a distance of less than 1000 kilometers from the second formation.

3. The system of claim 1, further comprising a connection between the mechanism for converting and the mechanism for releasing.

4. The system of claim 1, wherein the connection comprises a pipe.

5. The system of claim 1, wherein the mechanism for recovering is within a distance of 100 kilometers from the mechanism for converting.

6. The system of claim 1, further comprising at least one unit selected from the group consisting of catalytic cracking, hydrocracking, hydrotreating, coking, thermal cracking, distilling, reforming, polymerization, isomerization, alkylation, blending, and dewaxing.

7. The system of claim 6, wherein the at least one unit is adapted to convert the recovered oil and/or gas into at least one material selected from the group consisting of transportation fuels, heating fuel, lubricants, chemicals, and/or polymers.

* * * * *